(12) United States Patent
Kioua et al.

(10) Patent No.: US 12,214,893 B2
(45) Date of Patent: Feb. 4, 2025

(54) AIR INLET FOR AN AIRCRAFT PROPULSION UNIT COMPRISING A MEMBER FOR MOVING A MOVABLE UPSTREAM PORTION AND METHOD FOR USING SUCH AN AIR INLET

(71) Applicant: SAFRAN NACELLES, Gonfreville-l'Orcher (FR)

(72) Inventors: Hazem Kioua, Moissy-Cramayel (FR); Thomas Marlay, Moissy-Cramayel (FR); Damien Lemoine, Moissy-Cramayel (FR); Ophélie Schmitter, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/258,319

(22) PCT Filed: Dec. 21, 2021

(86) PCT No.: PCT/EP2021/086996
§ 371 (c)(1),
(2) Date: Jun. 19, 2023

(87) PCT Pub. No.: WO2022/144236
PCT Pub. Date: Jul. 7, 2022

(65) Prior Publication Data
US 2024/0294265 A1     Sep. 5, 2024

(30) Foreign Application Priority Data
Dec. 28, 2020   (FR) ...................................... 2014186

(51) Int. Cl.
*F01D 17/00* (2006.01)
*B64D 33/02* (2006.01)

(52) U.S. Cl.
CPC ............. *B64D 33/02* (2013.01); *F01D 17/00* (2013.01); *F05D 2260/53* (2013.01)

(58) Field of Classification Search
CPC ...... B64D 33/02; F01D 17/00; F05D 2260/53
See application file for complete search history.

(56) References Cited

U.S. PATENT DOCUMENTS

| 3,058,693 A | 10/1962 | Doak | |
| 5,014,933 A * | 5/1991 | Harm | B64D 33/02 181/220 |

(Continued)

FOREIGN PATENT DOCUMENTS

FR   3023586 A1   1/2016

OTHER PUBLICATIONS

Search Report from the French Intellectual Property Office on corresponding FR application (FR2014186) dated Sep. 1, 2021.

(Continued)

*Primary Examiner* — Elton K Wong
*Assistant Examiner* — Theodore C Ribadeneyra
(74) *Attorney, Agent, or Firm* — Alumen IP Law PC

(57) ABSTRACT

An air inlet for an aircraft propulsion unit having a movable upstream portion, a stationary downstream portion and at least one member for longitudinally translating the movable upstream portion between a retracted position in which the movable upstream portion is adjacent to the stationary downstream portion, and an extended position in which the movable upstream portion is separated from the stationary downstream portion, the moving member having at least one guiding bar connected to the movable upstream portion and a drive bar having a plurality of teeth, the stationary downstream portion having, for each moving member, a gear (Continued)

wheel configured to co-operate with the teeth in order to form a rack-and-pinion connection and at least one guiding member of the guiding bar.

20 Claims, 8 Drawing Sheets

(56) References Cited

U.S. PATENT DOCUMENTS

| | | | | |
|---|---|---|---|---|
| 10,221,764 | B2* | 3/2019 | Labrecque | F02C 7/045 |
| 11,390,393 | B2* | 7/2022 | Cochran | B64D 33/02 |
| 2010/0084507 | A1 | 4/2010 | Vauchel et al. | |
| 2010/0252689 | A1* | 10/2010 | Vauchel | F02C 7/04 |
| | | | | 244/53 B |
| 2011/0182727 | A1* | 7/2011 | Vauchel | B64D 29/08 |
| | | | | 415/213.1 |
| 2014/0127001 | A1* | 5/2014 | Todorovic | B64D 29/00 |
| | | | | 415/127 |
| 2019/0024609 | A1* | 1/2019 | Chuck | B64D 27/18 |
| 2020/0386158 | A1* | 12/2020 | Lacko | B64D 33/02 |
| 2022/0412256 | A1* | 12/2022 | Gormley | F02C 7/042 |

OTHER PUBLICATIONS

International Search Report and Written Opinion on corresponding PCT application (PCT/EP2021/086996) from International Searching Authority (EPO) dated Apr. 14, 2022.

\* cited by examiner

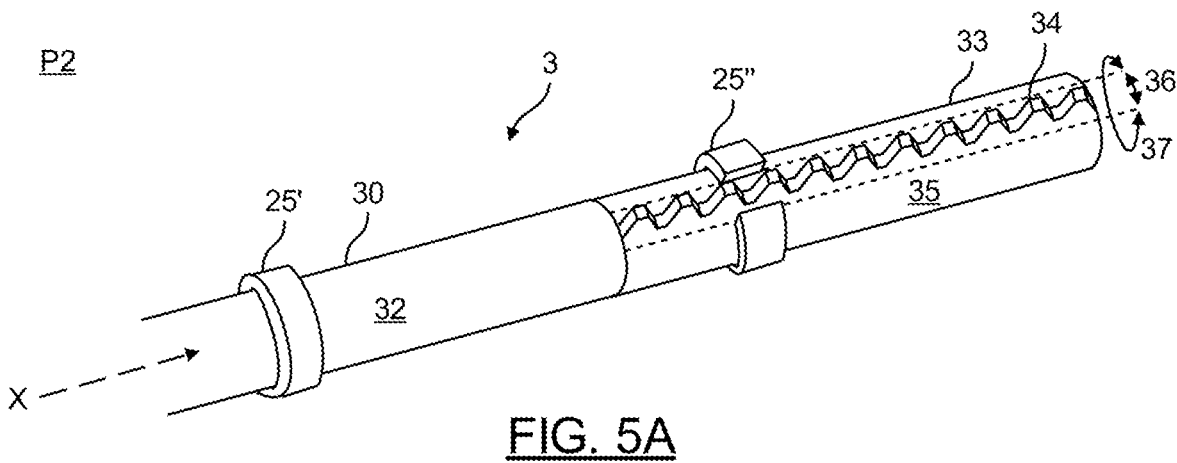
FIG. 5A
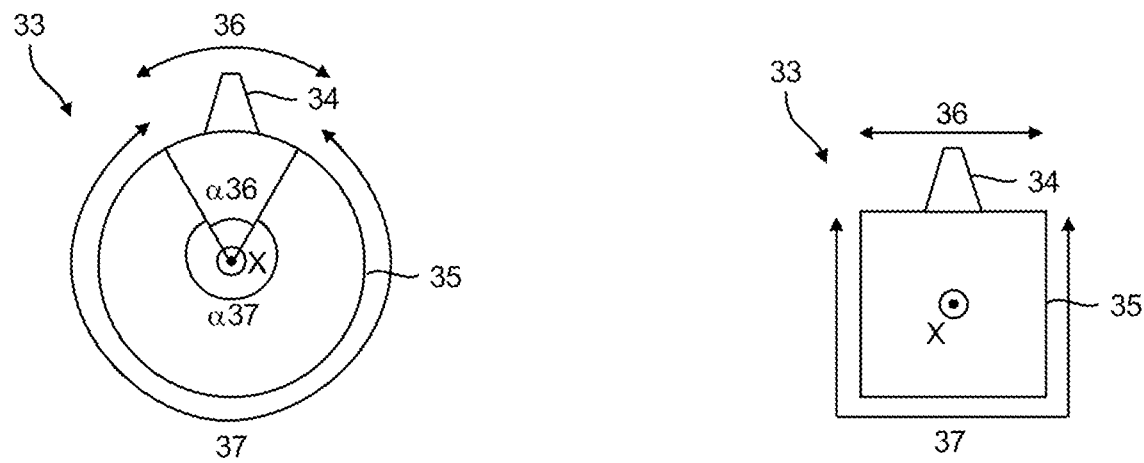
FIG. 5B
FIG. 5C

AIR INLET FOR AN AIRCRAFT PROPULSION UNIT COMPRISING A MEMBER FOR MOVING A MOVABLE UPSTREAM PORTION AND METHOD FOR USING SUCH AN AIR INLET

TECHNICAL FIELD

The present invention relates to the field of air inlets for aircraft propulsion assembly comprising a movable upstream part.

BACKGROUND

In a known manner, an aircraft propulsion assembly 108 extends along a longitudinal axis X oriented from upstream to downstream and comprising a turbomachine 106 and a nacelle 107 is represented in FIG. 1A. The turbomachine 106 extends along the longitudinal axis X and is configured to allow propulsion of the aircraft from the acceleration of an internal air flow F-INT circulating from upstream to downstream in the turbomachine 106. The nacelle 107, on the other hand, extends outwardly peripherally about the turbomachine 106 along the longitudinal axis X and makes it possible to guide the internal air flow F-INT in the turbomachine 106. Subsequently, the terms "upstream" and "downstream" are defined with respect to the orientation of the longitudinal axis X. The terms "internal" and "external" in turn are defined along the radial direction with respect to the longitudinal axis X. It is also set out that the internal air flow F-INT designates the air mass flow rate taken in the nacelle 107.

In a known manner, with reference to FIG. 1A and FIG. 1B, the nacelle 107 comprises at its upstream end a variable geometry air inlet 105 so as to adapt the internal air flow F-INT guided in the turbomachine 106 according to the flight conditions. More precisely, in a known manner, the air inlet 105 comprises a movable upstream part 101, a fixed downstream part 102 and linear actuators 103 mounted in the fixed downstream part 102 and equidistributed over the circumference of the air inlet 105. The linear actuators 103 are configured to translationally move together the movable upstream part 101 along the longitudinal axis X with respect to the fixed downstream part 102 between a retracted position P1 (FIG. 1A), in which the movable upstream part 101 is adjacent to the fixed downstream part 102, and a deployed position P2 (FIG. 1B), in which the movable upstream part 101 is spaced apart from the fixed downstream part 102.

In a known manner, as illustrated in FIG. 1A and FIG. 1B, the movable upstream part 101 comprises an upstream internal wall 110 pointing towards the longitudinal axis X and an upstream external wall 111 opposite to the upstream internal wall 110, which are connected together upstream by an air inlet lip 112 comprising a leading edge. The movable upstream part 101 has an aerodynamic rounded profile that makes it possible to separate an upstream air flow F into the internal air flow F-INT guided by the upstream internal wall 110 and an external air flow F-EXT guided by the upstream external wall 111. The fixed downstream part 102 in turn comprises a downstream internal wall 120 and a downstream external wall 121, which respectively extend in the downstream continuity of the upstream internal wall 110 and the upstream external wall 111 of the movable upstream part 101 in the retracted position P1. In the deployed position P2, the movable upstream part 101 and the fixed downstream part 102 are spaced apart by a through channel 104 for fluidly circulating between the external air flow F-EXT and the internal air flow F-INT.

In practice, it is known to use such a variable geometry air inlet 105 for a supersonic aircraft propulsion assembly, namely the turbomachine 106 of which is configured to allow propulsion of the aircraft up to speeds greater than the speed of sound. Indeed, the air inlet 105 in the retracted position P1 allows air intake adapted for high subsonic speeds, i.e. with Mach number greater than 0.5, and for supersonic speeds. The deployed position P2 in turn allows increasing the cross-section of the air inlet 105 and hence the internal air flow F-INT taken in, which makes it adapted to low subsonic speeds, i.e. with Mach number less than 0.5. This enables the internal air flow F-INT taken in the turbomachine 106 to be controlled.

In fact, such a variable geometry air inlet 105 has the drawback of increasing the overall size and on-board mass of the aircraft. In particular, the traditionally hydraulic, pneumatic or electric, linear actuators 103 used are numerous, heavy and occupy a large volume in the fixed downstream part 102. Such linear actuators are complex to integrate into an air inlet 105 having a low thickness. In addition, driving the movement of the movable upstream part 101 requires synchronizing the linear actuators 103, which is complex.

In the far field of vertical take-off aircraft, an air inlet with a translationally movable upstream part by means of a screw driven by the rotation of a nut is known from application U.S. Pat. No. 3,058,693A1. Such an air intake has the same drawbacks as previously described.

In the remote field of aircraft maintenance, an air inlet with a movable upstream part to facilitate, on the ground, access to the different pieces of equipment and/or their replacement is known from application US20100084507A1.

Thus, the invention aims to eliminate at least some of these drawbacks.

SUMMARY

The invention relates to an air inlet for an aircraft propulsion assembly, said aircraft propulsion assembly extending along a longitudinal axis oriented from upstream to downstream and comprising a turbomachine configured to allow propulsion of the aircraft from the acceleration of an internal air flow circulating from upstream to downstream in the turbomachine, said air inlet circumferentially extending about the longitudinal axis and comprising a movable upstream part, a fixed downstream part and at least one moving member configured to translationally move the movable upstream part with respect to the fixed downstream part, said movable upstream part comprising:
  an upstream internal wall, pointing towards the longitudinal axis and configured to guide the internal air flow,
  an upstream external wall, opposite to the upstream internal wall and configured to guide an external air flow, and
  an air inlet lip connecting the upstream internal wall and the upstream external wall,
  said movable upstream part being movable between a retracted position, in which the movable upstream part is adjacent to the fixed downstream part, and a deployed position, in which the movable upstream part is spaced apart upstream of the fixed downstream part in order to delimit therebetween a through channel for fluidly circulating between the external air flow and the internal air flow.

The invention is remarkable in that the moving member comprises:
- at least one guide bar connected to the movable upstream part, and
- a drive bar comprising a plurality of teeth, the fixed downstream part comprising, for each moving member:
- a toothed wheel configured to be rotatably driven and to cooperate with the teeth of the drive bar in order to form a rack-and-pinion connection for moving the moving member and the movable upstream part, and
- at least one guide member configured to guide the guide bar when moving the moving member.

It is set out that the term "bar" is employed throughout the application to describe a long and rigid part, of any cross-section, such as circular, square, rectangular or flattened as non-exhaustive examples.

By virtue of the invention, the movable upstream part of a variable geometry air inlet can advantageously be moved in a precise, durable and practical manner by virtue of a rack-and-pinion connection integrated into the fixed downstream part and translationally guided. The movement of the movable upstream part allows the internal air flow taken in the air inlet to be modified in-flight and thus adapt to different aircraft speeds, such as changing to supersonic speeds by way of example. The rack-and-pinion connection has the advantage, compared to traditionally used linear actuators, of being more robust and economical while offering high precision. The guide members also make it possible to force the movable upstream part to move along a given longitudinal direction, avoiding any deviation or variability, which increases the reliability of the rack-and-pinion connection.

Preferably, the moving member is configured to move the movable upstream part in substantially longitudinal translation with respect to the fixed downstream part, in other words along a direction forming an angle of at most 20° with respect to the longitudinal axis.

Preferably, the guide member is configured to form a slide connection with the moving member.

According to one aspect of the invention, the movable upstream part circumferentially extends about the longitudinal axis to act globally and homogeneously on the intake of the internal air flow. Preferably, the movable upstream part forms a unitary assembly, which facilitates its movement. Preferably, the movable upstream part forms a one-piece assembly.

Preferably, the air inlet comprises a plurality of moving members so as to form a plurality of rack-and-pinion connections. The rack-and-pinion connection advantageously makes it possible to facilitate synchronization of the moving members and thus move the movable upstream part quickly and easily. Preferably, the air inlet comprises a plurality of guide bars equidistributed over the circumference of the air inlet to distribute forces applied to the movable upstream part and thus favor its movement.

According to one preferred aspect of the invention, the upstream internal wall and the upstream external wall of the movable upstream part have a substantially identical longitudinal length. It is set out that the term "significantly" indicates here that the length of the upstream internal wall varies by at most 10% in relation to that of the upstream external wall. The movable upstream part and the fixed downstream part thus cooperate easily and conveniently in the retracted position. In the deployed position, the through channel advantageously makes it possible to strongly increase the air inlet cross-section area and thus the internal air flow taken in, as well as reduce the noise generated.

According to one aspect of the invention:
- the drive bar extends as a downstream extension of the guide bar and comprises an external wall comprising an angular drive portion, where the teeth are mounted, and an angular guide portion, and
- at least one guide member is in the form of a downstream guide member configured to successively guide the guide bar and the angular guide portion of the drive bar.

Advantageously, this makes it possible to reduce the overall size and the on-board mass of the moving member, in particular the longitudinal length of the guide bar by allowing a same guide member to guide the guide bar and the drive bar.

According to one aspect of the invention, the angular guide portion extends over at least 120° from the external wall of the drive bar. Preferably, the angular guide portion extends over more than 180° from the external wall of the drive bar, and preferentially, over at most 330° from the external wall of the drive bar. An at least semi-peripheral guiding of the drive bar advantageously allows precise control of the trajectory of the movable upstream part. This ensures robustness and durability of the moving member without disturbing the rack-and-pinion connection.

According to one aspect of the invention, the angular drive portion comprises a recessed zone in which the teeth are mounted. Such a mounting of the teeth in a recess allows their overall size to be limited. Preferably, the teeth are mounted in the recessed zone so that they extend radially inwardly of the guiding angular portion with respect to the axis of the moving member. In other words, the drive bar has a transverse cross-section, inclusive of teeth, which is included in a transverse cross-section of the guide bar. The size and shape of the drive bar are thus equal to or smaller than those of the guide bar, so that a guide member adapted to the guide bar is also adapted to the drive bar.

According to a first aspect of the invention, the downstream guide member peripherally extends about the moving member. This allows optimal guidance, namely precise and fine control of the direction of movement of the moving member, without any deviation or variability, which increases its longevity.

According to another aspect of the invention, the downstream guide member partially peripherally extends about the moving member so as to avoid the annular drive portion and not restrict the rack-and-pinion connection.

According to one aspect of the invention, at least one moving member comprises a plurality of guide bars and a connection element configured to connect the drive bar to each guide bar. This makes it possible to reduce the number of moving members, and in particular the number of drive bars, which reduces the overall size and the on-board mass.

According to a preferred aspect of the invention, at least one guide member is in the form of at least one upstream guide member attached to an upstream end of the fixed downstream part. Preferably, the upstream guide device peripherally extends about the guide bar. Such an upstream guide device protects the moving member in a zone subject to turbulence and vibration.

The invention further relates to an aircraft propulsion assembly extending along a longitudinal axis oriented from upstream to downstream and comprising a turbomachine configured to enable propulsion of the aircraft at supersonic speeds from the acceleration of an internal air flow circulating from upstream to downstream in the turbomachine, said aircraft propulsion assembly comprising an air intake as previously described.

Preferably, the turbomachine is supersonic, in other words configured to reach speeds greater than the speed of sound. The retracted position of the air inlet is advantageously adapted for high subsonic speeds, i.e. with a Mach number greater than 0.5, and supersonic speeds of the turbomachine. The deployed position is in turn adapted for low subsonic speeds, i.e. with a Mach number less than 0.5.

The invention further relates to a method for using in flight an air inlet for an aircraft propulsion assembly as previously described, wherein the toothed wheel is driven in a first direction of rotation to move the movable upstream part in a first direction of translation oriented from the deployed position to the retracted position, so as to reduce the internal air flow taken in.

The invention also relates to a method for using in flight an air inlet for an aircraft propulsion assembly as previously described, wherein the toothed wheel is driven in a second direction of rotation, opposite to the first direction of rotation, to move the movable upstream part in a second direction of translation, opposite to the first direction of translation, oriented from the retracted position to the deployed position, so as to increase the internal air flow taken in.

Advantageously, such a variable geometry air inlet allows the internal air flow to be modified by simply rotating the toothed wheel, when changing the speed of the aircraft propulsion assembly. Switching from the retracted position to the deployed position and vice versa is advantageously simple, fast and convenient to implement.

The invention additionally relates to a method for using in flight an aircraft propulsion assembly, wherein, when the speed generated by the turbomachine is greater than a threshold speed, the toothed wheel is driven in a first direction of rotation to move the movable upstream part in a first direction of translation oriented from the deployed position to the retracted position, in order to reduce the internal air flow taken in.

The invention further relates to a method for using in flight an aircraft propulsion assembly, wherein, when the speed generated by the turbomachine is less than a threshold speed, the toothed wheel is driven in a second direction of rotation, opposite to the first direction of rotation, to move the movable upstream part in a second direction of translation, opposite to the first direction of translation, oriented from the retracted position to the deployed position, so as to increase the internal air flow taken in.

Preferably, the threshold speed corresponds to a Mach number substantially equal to 0.5, to within 20%. Such a threshold speed makes it possible to distinguish, on the one hand, low subsonic speeds requiring a large cross-section air inlet, and, on the other hand, high subsonic speeds and supersonic speeds requiring a smaller cross-section air inlet.

Advantageously, such a variable geometry air inlet is particularly convenient for a supersonic aircraft propulsion assembly, in which the speeds generated are both subsonic and supersonic. A simple rotation of the toothed wheel advantageously allows simple, fast and convenient control of the intake of the internal air flow.

BRIEF DESCRIPTION OF THE DRAWINGS

The invention will be better understood upon reading the following description, given as an example, and by referring to the following figures, given as non-limiting examples, wherein identical references are given to similar objects.

FIG. 5A is a schematic perspective representation of the moving member of the air inlet in the deployed position of FIG. 4B;

FIG. 5B is a schematic representation in cross-section view of the moving member of FIG. 5A;

FIG. 5C is a schematic representation in cross-section view of a moving member according to one alternative embodiment of the invention;

It should be noted that the figures set out the invention in detail in order to implement the invention, said figures may of course be used to better define the invention if necessary.

DETAILED DESCRIPTION

Figure 1A:
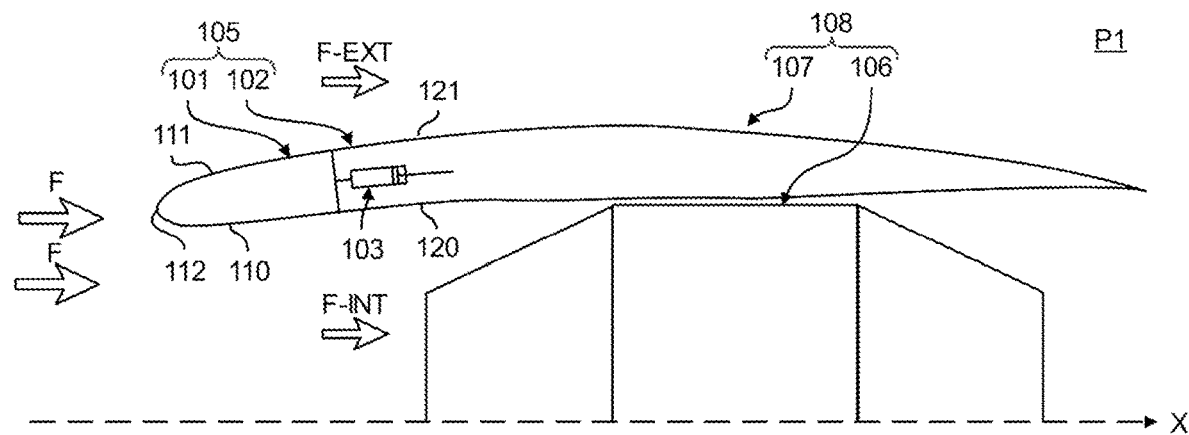
FIG. 1A.
Figure 1B:
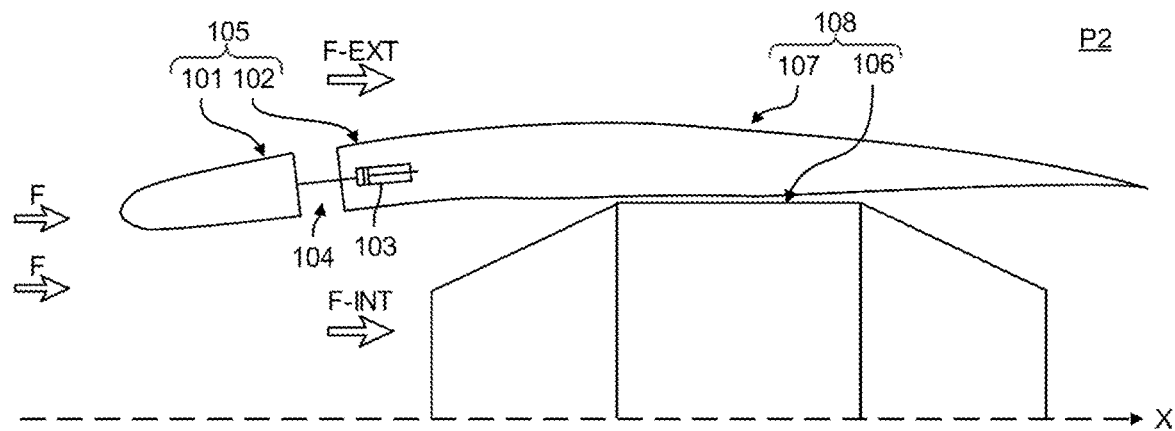
FIG. 1B are schematic representations in longitudinal half cross-section view of an aircraft propulsion assembly comprising an air inlet according to prior art with a movable upstream part respectively in the retracted position and in the deployed position.
Figure 2A:
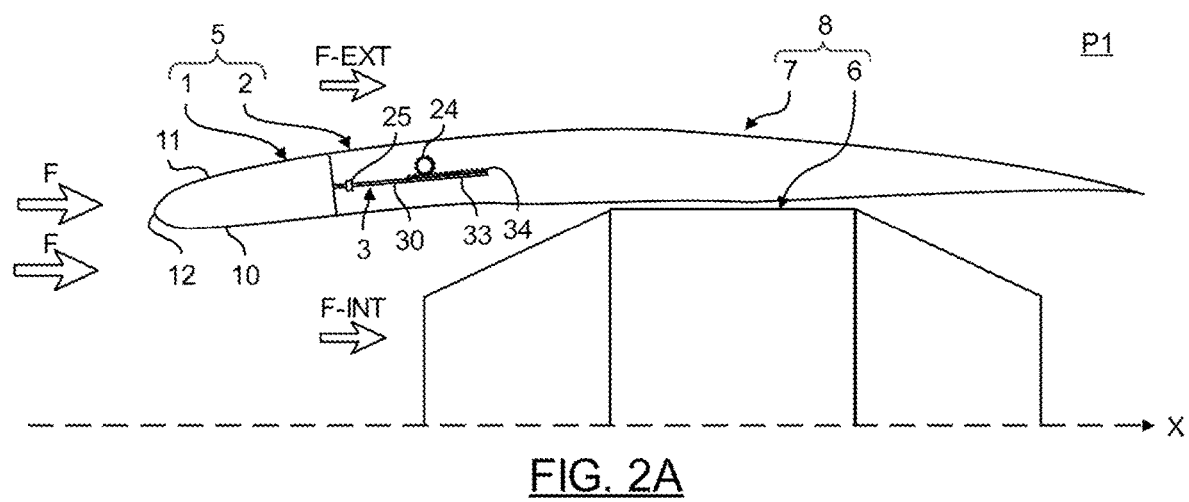
FIG. 2A.

With reference to FIG. 2A and as described in the preamble, the invention relates to an aircraft propulsion assembly 8 extending along a longitudinal axis X oriented from upstream to downstream and comprising a turbomachine 6 and a nacelle 7. The turbomachine 6 extends along the longitudinal axis X and is configured to allow propulsion of the aircraft from the acceleration of an internal air flow F-INT circulating from upstream to downstream in the turbomachine 6. The nacelle 7 in turn extends outwardly peripherally about the turbomachine 6 along the longitudinal axis X and makes it possible to guide the internal air flow F-INT into the turbomachine 6. Subsequently, the terms "upstream" and "downstream" are defined with respect to the orientation of the longitudinal axis X. Unless otherwise indicated, the terms "internal" and "external" in turn are defined along the radial direction with respect to the longitudinal axis X. It is also set out that the internal air flow F-INT designates the air mass flow rate taken in the nacelle 7.

Figure 2B:
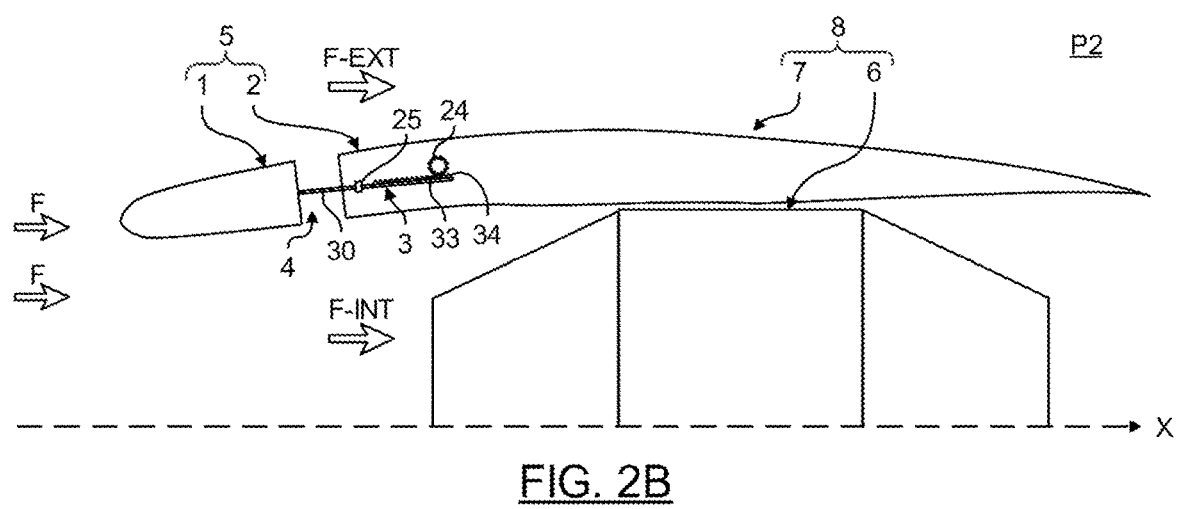
FIG. 2B are schematic representations in longitudinal half cross-section view of an aircraft propulsion assembly comprising an air inlet according to one embodiment of the invention with a movable upstream part respectively in the retracted position and in the deployed position according to one embodiment of the invention.

With reference to FIG. 2A and FIG. 2B and as described in the preamble, the nacelle 7 comprises at its upstream end a variable geometry air inlet 5 in order to adapt the internal air flow F-INT guided in the turbomachine 6 according to the flight conditions. More precisely, in a known manner, the air inlet 5 comprises a movable upstream part 1, a fixed downstream part 2 and moving members 3 mounted in the fixed downstream part 2 and configured to translationally move the movable upstream part 1 with respect to the fixed downstream part 2 between:
- a retracted position P1 (FIG. 2A), in which the movable upstream part 1 is adjacent to the fixed downstream part 2, and
- a deployed position P2 (FIG. 2B), in which the movable upstream part 1 is spaced apart upstream of the fixed downstream part 2.

Figure 3:
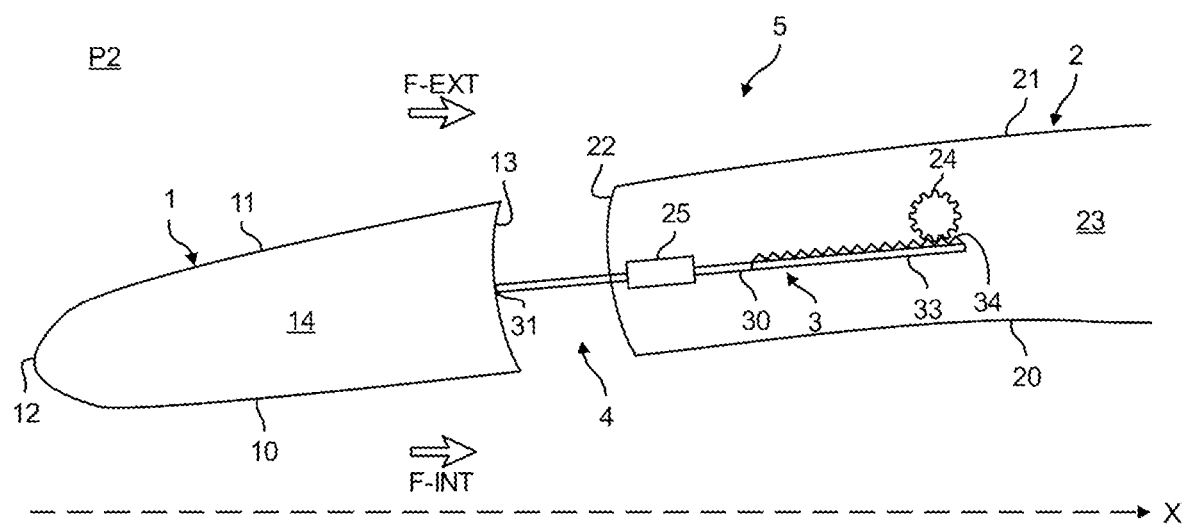
FIG. 3 is a schematic close-up representation of the air inlet in the deployed position of FIG. 1B.

As illustrated in FIG. 2A, FIG. 2B and FIG. 3 and described in the preamble, the movable upstream part 1 comprises an upstream internal wall 10 pointing towards the longitudinal axis X and an upstream external wall 11 opposite to the upstream internal wall 10, which are connected together upstream through an air inlet lip 12 comprising a leading edge. The movable upstream part 1 has an aerodynamic rounded profile that makes it possible to separate an upstream air flow F into the internal air flow F-INT guided by the upstream internal wall 10 and an external air flow F-EXT guided by the upstream external wall 11. The fixed downstream part 2 in turn comprises a downstream internal wall 20 and a downstream external wall 21 (FIG. 3) which extend respectively in the downstream continuity of the upstream internal wall 10 and the upstream external wall 11 of the movable upstream part 1 in the retracted position P1. In the deployed position P2, the movable upstream part 1 and the fixed downstream part 2 together delimit a through channel 4 for fluidly circulating between the external air flow F-EXT and the internal air flow F-INT.

In the example of FIG. 3, the movable upstream part 1 comprises a downstream end 13 which delimits together with the upstream internal wall 10, the upstream external wall 11 and the air inlet lip 12, an annular cavity 14 with a longitudinal axis X. The movable upstream part 1 circumferentially extends about the longitudinal axis X. Preferably, the movable upstream part 1 forms a unitary, preferably one-piece, assembly, namely originating from the same material.

Still in the example in FIG. 3, the fixed downstream part 2 comprises an upstream end 22 connecting the downstream internal wall 20 and the downstream external wall 21, which cooperates by form-fitting with the downstream end 13 of the movable upstream part 1 in the retracted position P1, and delimits the through channel 4 with the downstream end 13 when the movable upstream part 1 is in the deployed position P2. In this example, the upstream internal wall 10 and the upstream external wall 11 have an identical length to facilitate cooperation. Still in this example, the downstream end 13 of the movable upstream part 1 and the upstream end 22 of the fixed downstream part 2 extend substantially transversely to the longitudinal axis X in order to cooperate in a simple and practical manner by contact. As a result, the through channel 4 extends substantially transversely to the longitudinal axis X. Preferably, as illustrated in FIG. 3, the downstream end 13 of the movable upstream part 4 is concave and the upstream end 22 of the fixed downstream part 2 is convex, so that the through channel 4 is curved and allows aerodynamic fluidic circulation without sudden change of direction.

By way of example, it is known to use a variable geometry air inlet 5 for a supersonic aircraft propulsion assembly, namely whose turbomachine 6 is configured to allow propulsion of the aircraft up to speeds greater than the speed of sound. Indeed, the air inlet 5 in the retracted position P1 allows air intake adapted for high subsonic speeds, i.e. with a Mach number greater than 0.5, and supersonic speeds. The deployed position P2 in turn allows increase in the cross-section area of the air inlet 5 and hence the internal air flow F-INT taken in for low subsonic speeds, i.e. with Mach number less than 0.5. It goes without saying that the invention is not limited to the supersonic context and applies to any aircraft propulsion assembly for which it is desired to modify the intake of internal air flow F-INT in flight to adapt to the flight conditions. The retracted position P1 and the deployed position P2 especially allow control of the intake of the internal air flow F-INT in a subsonic aircraft propulsion assembly.

Preferably, the air inlet 5 has an elongated shape adapted for a subsonic and/or supersonic aircraft propellant assembly. According to one aspect, the air inlet 5 also comprises an air inlet cone to maintain a subsonic internal air flow F-INT in the turbomachine 6 at supersonic speeds of the aircraft.

According to the invention, with reference to FIG. 2A, FIG. 2B and FIG. 3, each moving member 3 comprises one or more guide bars 30 connected to the movable upstream part 1, and a drive bar 33 comprising a plurality of teeth 34.

Still according to the invention, the fixed downstream part 2 in turn comprises, for each moving member 3:
- a toothed wheel 24 configured to be rotatably driven and to cooperate with the teeth 34 of the drive bar 33 in order to form a rack-and-pinion connection for moving the moving member 3 and the movable upstream part 1, and
- one or more guide members 25 configured to guide the guide bar(s) 30 when moving the moving member 3.

Preferably, as illustrated in FIG. 2A, FIG. 2B and FIG. 3, the moving member 3 makes it possible to move the movable upstream part 1 in substantially longitudinal translation, namely in a direction forming an angle of at most 20° with the longitudinal axis X. Also preferably, each guide member 25 forms a slide connection with the moving member 3, along the substantially longitudinal direction of movement.

In the example in FIG. 2A, FIG. 2B and FIG. 3, a single moving member 3 is represented but, preferably, several moving members 3 are distributed about the circumference of the air inlet 5 to distribute forces applied to the movable upstream part 1 and facilitate its movement. Preferably, the air inlet 5 comprises at least three moving members 3, and preferably at most eight for easy movement without significantly increasing the mass and the overall size generated. Also preferably, the moving members 3 are equidistributed about the circumference of the air inlet 5. It goes without saying that the invention also applies for a different distribution and/or number of moving members 3. Several embodiments are described below, considering a single moving member 3. Preferably, all the moving members 3 are identical. Alternatively, the air inlet 5 comprises moving members 3 according to several different embodiments.

In the embodiment illustrated in FIG. 3, the moving member 3 comprises a single guide bar 30 comprising an upstream end 31 attached to the movable upstream part 1, preferably at the downstream end 13 of the movable upstream part 1. When the movable upstream part 1 is retracted P1, the guide bar 30 extends into an annular cavity 23 of the fixed downstream part 2, delimited by the downstream internal wall 20, the upstream end 22 and the downstream external wall 21. When the movable upstream part 1 is deployed P2, the guide bar 30 also extends into the through channel 4.

In this example, the guide bar 30 is guided by a single guide member 25 mounted in the annular cavity 23 of the fixed downstream part 2, more precisely in the vicinity of the upstream end 22 to enable precise guidance. Preferably, other guide members 25 are mounted downstream to enhance precision in guiding the moving member 3. A moving member 3 guided by several guide members 25 is advantageously more robust and durable. However, it goes without saying that the number and position of the guide members 25 may differ.

Preferably, the guide member 25 also provides guidance that is peripheral, namely global over the entire periphery of the guide bar 30, and is in the form by way of example of a bushing or a linear ball bearing. Alternatively, the guide member 25 provides partially peripheral guidance, namely located on an angular portion of the periphery of the guide bar 30, and is in the form by way of example of a rail, rollers or rolls. The guide members 25 may be of identical or different shape from one moving member 3 to another and along a same moving member 3. The guide members 25 and/or the guide bar 30 are preferably lubricated to promote the slide connection.

Still with reference to FIG. 3, the drive bar 33 extends into the annular cavity 23 of the fixed downstream part 2, in the downstream continuity of the guide bar 30. Preferably, the drive bar 33 and the guide bar 30 form a same part of the same material. In this example, the sliding member 3 thus extends in a rectilinear manner and substantially along the longitudinal axis X. The toothed wheel 24 is in turn rotatably mounted about a fixed axis transverse to the longitudinal axis X and comprises teeth which cooperate with the teeth 34 of the drive bar 33 so as to translationally move the drive bar 33 and as a result the moving member 3.

Figure 4A:
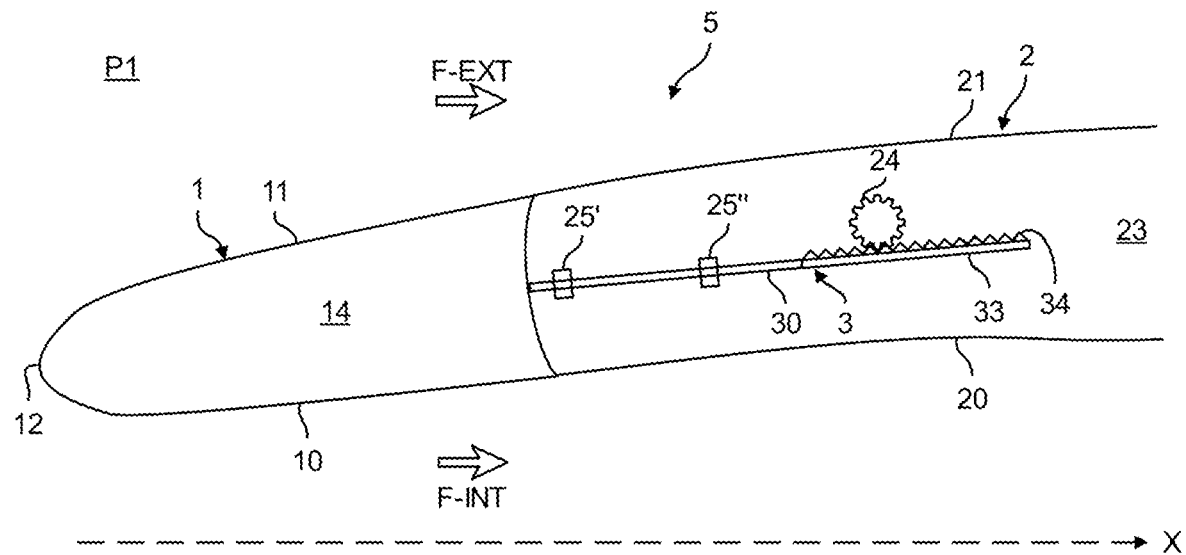
FIG. 4A.
Figure 4B:
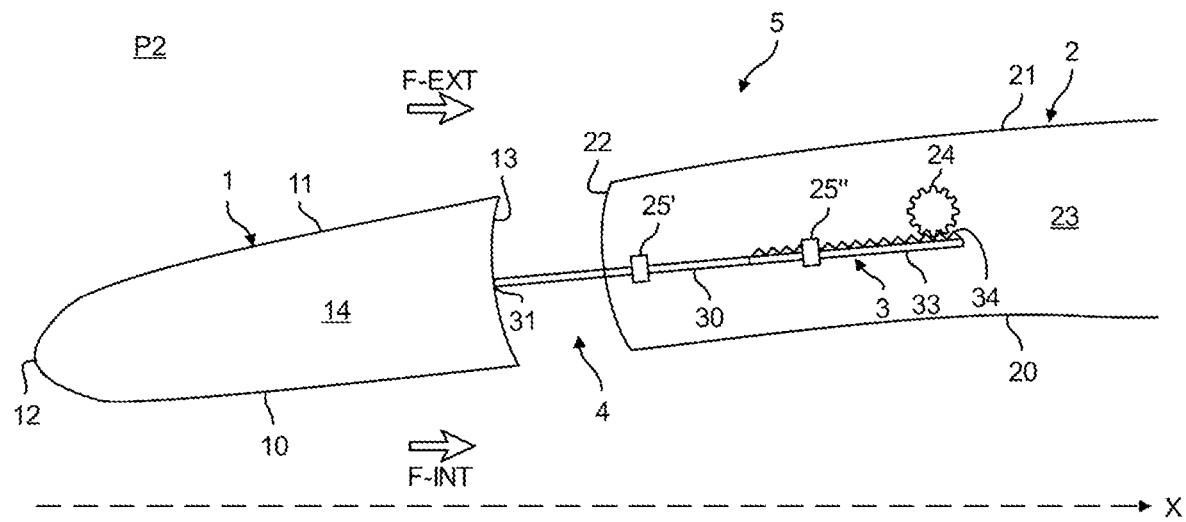
FIG. 4B are schematic representations in longitudinal half cross-section view of the air inlet according to another embodiment of the invention in the retracted position and deployed position respectively.

The embodiment illustrated in FIG. 4A and FIG. 4B differs from the previous embodiment in that the air inlet 5 comprises two guide members 25', 25", namely an upstream guide member 25' and a downstream guide member 25", and in that the downstream guide member 25" is also configured to guide the drive bar 33. As illustrated in FIG. 4A and FIG. 4B, the upstream guide member 25' extends in the vicinity of the upstream end 22 and is configured to guide the guide bar 30 as well as the guide member 25 of FIG. 3. The downstream guide member 25" in turn extends downstream of the upstream guide member 25' so as to successively guide the guide bar 30 and the drive bar 33 when moving the movable upstream part 1. In practice, the downstream guide member 25" is in contact with the guide bar 30 in the retracted position P1 (FIG. 4A) and the drive bar 33 in the deployed position P2 (FIG. 4B). When the movable upstream part 1 is deployed P2, the downstream guide member 25" thus guides the guide bar 30 and then the drive bar 33, and conversely when the movable upstream part 1 is retracted P1. This type of successive guidance the enables stability to be increased upon moving and improves load transmission. This further makes it possible to reduce the length of the guide bar 30 and thus to overall reduce the mass and overall size of the moving member 3.

In the example of FIG. 5A representing a close-up view of FIG. 4B, the guide members 25', 25" are in the form of linear ball bearings or bushings. The drive bar 33 comprises an angular drive portion 36 where the teeth 34 are located and an angular guide portion 37 devoid of teeth 34 and configured to cooperate with the downstream guide member 25". In other words, the drive 36 and guide 37 angular portions each extend along the entire length of the drive bar 33 in a partially peripheral and complementary manner. The downstream guide member 25" thus cooperates with the angular guide portion 37 while the toothed wheel 24 cooperates with the angular drive portion 36, without interference or discomfort.

More precisely, as illustrated in FIG. 5B, the drive angular portion 36 extends in this example at an angle $\alpha 36$ of about 60° while the angular guide portion 37 extends complementarily at an angle $\alpha 37$ of about 300°. Preferably, the angular guide portion 37 extends at an angle $\alpha 37$ greater than 120°, preferably greater than 180°, especially in the case of a linear ball bearing or a bushing, to ensure sufficient and precise guidance. Also preferably, the angle $\alpha 37$ is less than 330° to allow undisturbed driving of the teeth 34.

As illustrated in FIG. 5A and FIG. 5B, the angular guide portion 37 preferably extends as a longitudinal extension of the guide bar 30 to promote continuity in guidance. Thus, in this example, the guide bar 30 comprises a cylindrical external wall 32 having circular cross-section and the drive bar 33 comprises an external wall 35 also cylindrical having circular cross-section with the same diameter. As previously, the guide bar 30 and the drive bar 33 form a same part made of the same material. Still in this example, the teeth 34 are mounted projecting from the external wall 35 of the drive bar 33 and the downstream guide member 25" extends partially peripherally about the moving member 3, namely only about the angular guide portion 37. The angular opening of the downstream guide member 25" is less than or equal to the angle $\alpha 37$ of the angular guide portion 37. Thus, the downstream guide member 25" ensures partial angular guidance of the guide bar 30 and the drive bar 33.

It is self-evident that the moving member 3 may comprise a transverse cross-section of any shape, other than the circular one described. FIG. 5C thus illustrates another example in which the drive bar 33 and the guide bar 30 have a square transverse cross-section. A rectangular or flattened transverse cross-section could also be used.

Figure 6A:
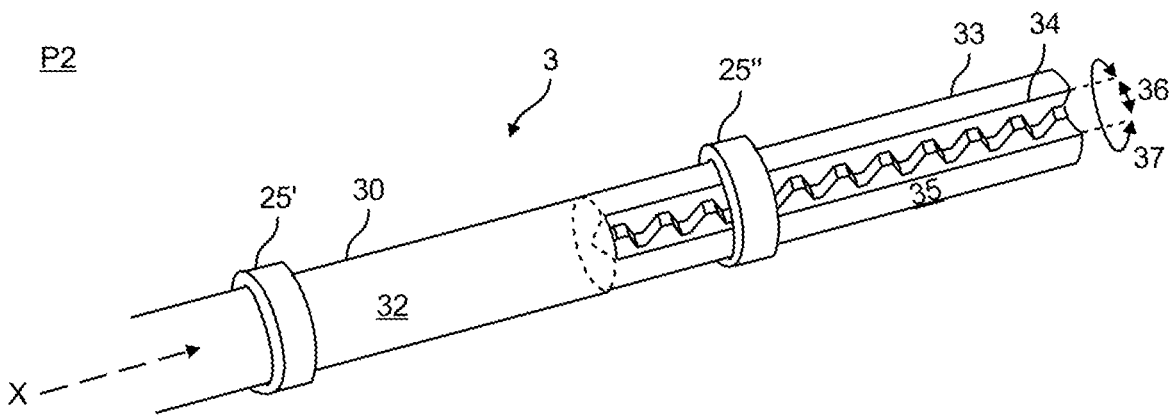
FIG. 6A is a schematic perspective representation of the moving member according to another embodiment of the invention.
Figure 6B:
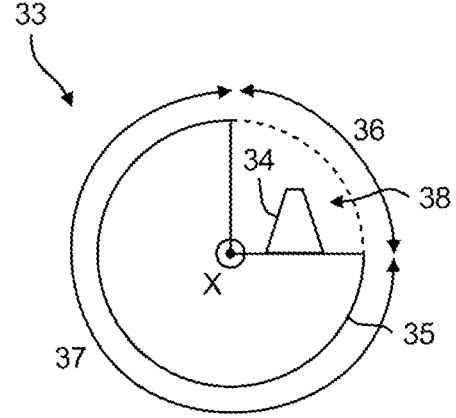
FIG. 6B is a schematic representation in transverse cross-section view of the moving member of FIG. 6A.

According to one alternative embodiment, with reference to FIG. 6A and FIG. 6B, only the angular guide portion 37 extends as an extension of the guide bar 30 and the angular drive portion 36 comprises a recessed zone 38 in which the teeth 34 are mounted. Thus, the teeth 34 do not protrude as an extension from the guide bar 30.

In this example, the guide bar 30 thus comprises an external wall 32 with a cylindrical transverse cross-section and the drive bar 33 comprises an external wall 35 which comprises a cylindrical transverse cross-section of the same diameter except at the angular drive portion 36 where the recessed zone 38 has been dug.

As illustrated in FIG. 6A and FIG. 6B, the transverse cross-section of the drive bar 33 is preferably included in that of the guide bar 30, so as to enable the use of a downstream guide member peripherally extending, such as that illustrated in FIG. 6A. In other words, the transverse cross-section of the drive bar 33 is preferably of shape and size less than or equal to the transverse cross-section of the guide bar 30 so that a downstream guide member 25"

adapted to peripherally guide the guide bar 30 can also be adapted to guide the drive bar 33.

Thus, in the example of FIG. 6A and FIG. 6B, the teeth 34 extend radially internally to the angular guide portion 37 with respect to the axis of the moving member 3. As illustrated in FIG. 6B, this results in that the cross-section of the drive bar 33, comprising the teeth 34, is included in the circular cross-section of the guide bar 30 represented in dashed line. Thus, the downstream guide member 25″ ensures peripheral angular guidance of the guide bar 30 and partial guidance of the drive bar 33 by encircling the teeth 34.

The moving member 3 can be guided and driven along its entire length without stress. This advantageously reduces the length of the moving member and accordingly its overall size. Such integrated teeth 34 enables the transverse overall size to be limited, which is advantageous for forming an air inlet 5 with low thickness.

Figure 6C:
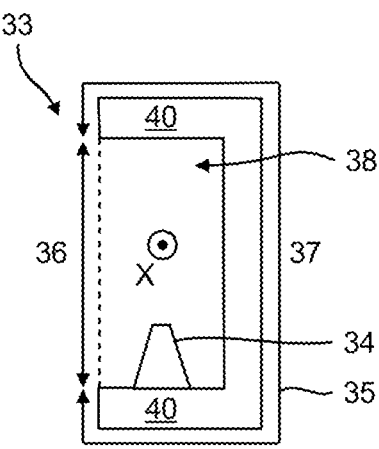
FIG. 6C is a schematic representation in cross-section view of a moving member according to one alternative embodiment of the invention.

FIG. 6C illustrates another example of a guide bar 30 comprising a recessed zone 38 in which the teeth 34 are mounted. In this example, the guide bar 30 has a rectangular cross-section in which the recessed zone 38, also of rectangular cross-section, has been dug. Thus, the guide bar 30 has a U-shaped cross-section. The guide bar 30 comprises two branches 40 connected to each other and delimiting the recessed zone 38 on either side. In this example, both branches 40 extend horizontally, one above the other. The teeth 34 are mounted to the lower branch 40 and extend vertically. The two branches 40 are far enough from each other so as to allow the toothed wheel 24 to pass therethrough to cooperate with the teeth 34.

Figure 7A:
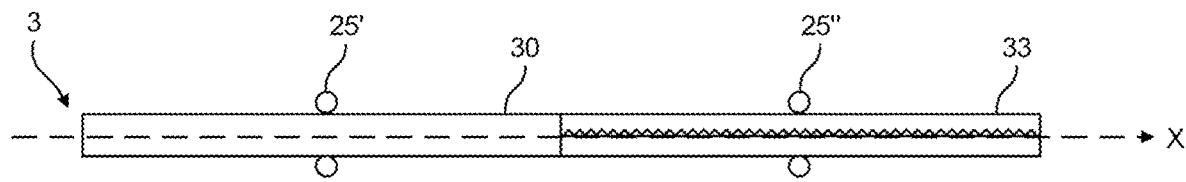
FIG. 7A.
Figure 7B:
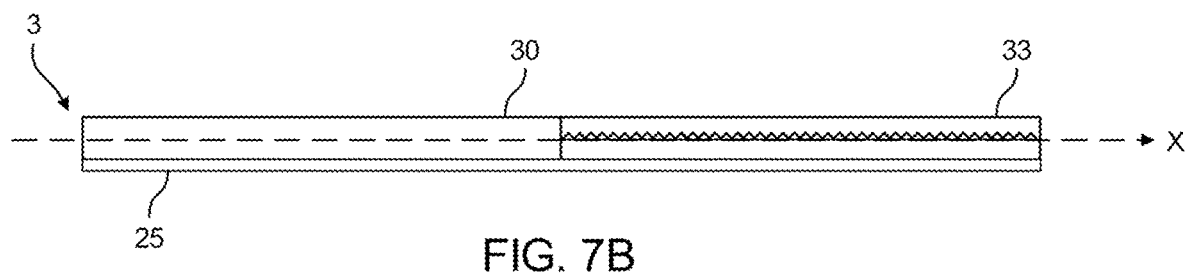
FIG. 7B.
Figure 7C:
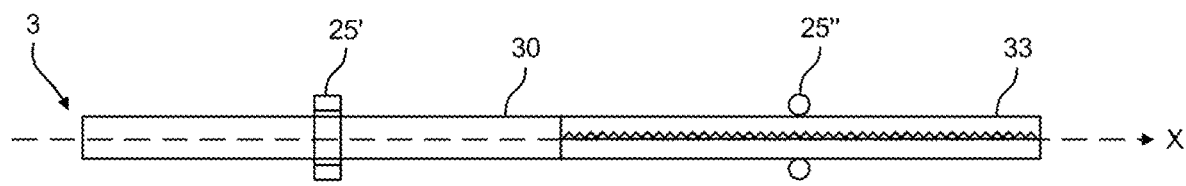
FIG. 7C are schematic representations in longitudinal cross-section view of a moving member according to three other embodiments of the invention.

FIGS. 7A, 7B and 7C illustrate other embodiments of the invention in which the guide member(s) is (are) in a form other than the linear ball bearing and the bushing of FIGS. 5A and 6A. In the example in FIG. 7A, the upstream guide member 25′ and the downstream guide member 25″ are each in the form of rollers or rolls. More precisely, the upstream guide member 25′ comprises an upper rotating member and a lower rotating member extending on either side of the guide bar 30 and cooperating with the same so as to translationally drive it. The same applies to the downstream guiding device 25″, which is also configured to cooperate with the drive bar 33 as previously described.

In the example in FIG. 7B, the guide member 25 is in the form of a fixed rail. The guide bar 30, and in this example also the drive bar 33, are configured to cooperate directly or indirectly with the rail so as to allow their translation.

It goes without saying that the invention is not limited to the examples of guide members 25, 25′, 25″ previously described. Furthermore, in the example of FIGS. 5A, 6A and 7A, all the guide members 25′, 25″ are of identical nature but it goes without saying that one or more guide members 25′, 25″ could differ from the others. Thus, in the example in FIG. 7C, the upstream guide member 25′ is in the form of a linear ball bearing while the downstream guide member 25″ is in the form of rolls.

Figure 8:
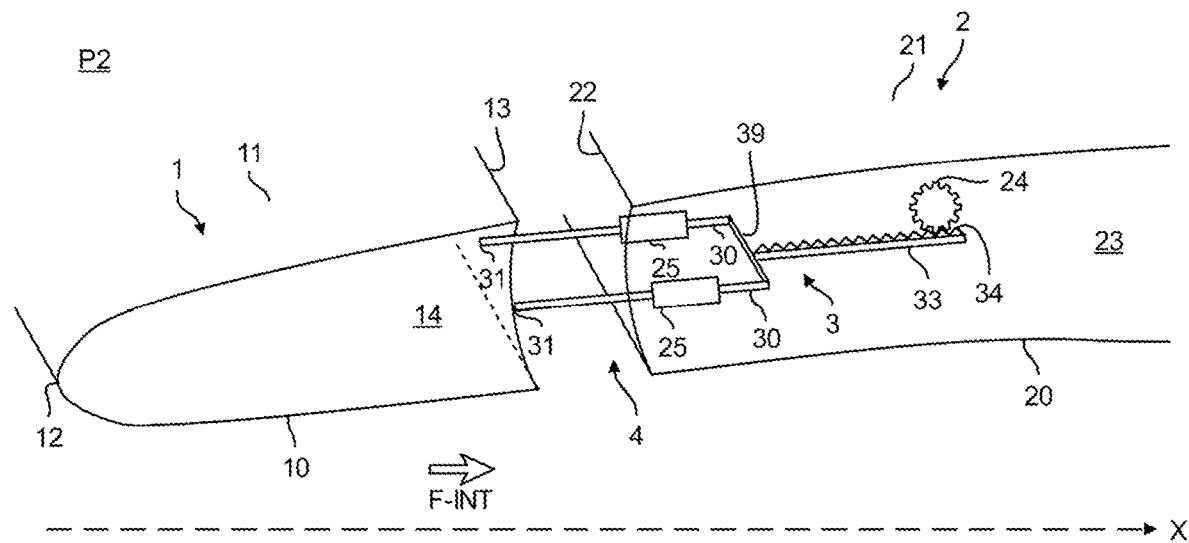
FIG. 8 is a schematic perspective representation of the air inlet in the deployed position according to an alternative embodiment of the invention.

According to another embodiment illustrated in FIG. 8, the moving member 3 comprises several guide bars 30, namely two in this example, as well as a connection element 39 connecting the guide bars 30 to the drive bar 33. In this example, the connection element 39 extends substantially transversely to the longitudinal axis X and is in the form of a bar. As illustrated in FIG. 8, preferably, the drive bar 33 extends radially between the guide bars 30, in a centered manner to distribute forces equally. Advantageously, such an embodiment makes it possible to reduce the number of moving members 3 required and to limit the number of rack-and-pinion connections, which reduces the overall size and the onboard mass.

A method for using the air inlet 5 previously described in flight is described below. It is considered that the movable upstream part 1 is initially in the deployed position P2 and that the aircraft propulsion assembly 8 generates a low subsonic speed in flight, namely with a Mach number below 0.5.

Figure 9:
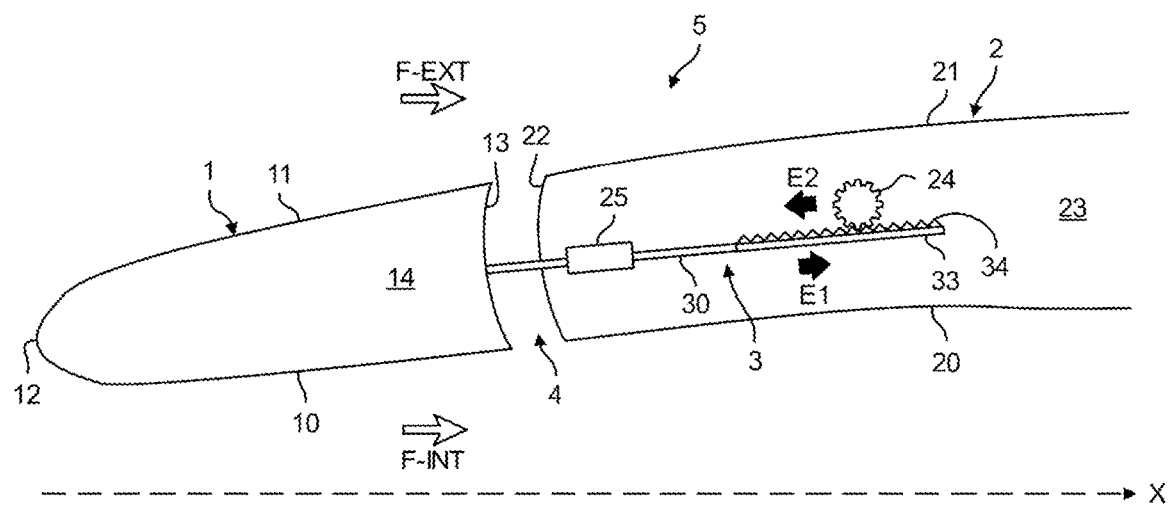
FIG. 9 is a schematic representation of the method for using the air inlet according to one embodiment of the invention.

With reference to FIG. 9, when the aircraft propulsion assembly 8 accelerates at high subsonic speeds or at supersonic speeds, the toothed wheel 24 is moved to move the movable upstream part 1 in a first direction of translation E1 oriented towards the retracted position P1, so as to reduce the cross-section area of the air inlet 5 and thus the internal air flow F-INT taken in.

Still with reference to FIG. 9, when the aircraft propulsion assembly 8 decelerates at low subsonic speeds, the toothed wheel 24 is moved in a second direction of rotation, opposite to the first direction of rotation, to move the movable upstream part 1 in a second direction of translation E2 towards the deployed position P2, so as to increase the cross-section area of the air inlet 5 and thus the internal air flow F-INT taken in.

Advantageously, the moving members 3 of the air inlet 5 according to the invention make it possible to move the movable upstream part 1 responsively, quickly and precisely by virtue of a rack-and-pinion connection. In addition, the moving members 3 are easily synchronizable and have reduced mass and overall size compared to the linear actuators traditionally used. This is particularly verified in the embodiments with guidance of the drive bar 33, in which the guide member 25″ allows successive guidance of the guide bar 30 and the drive bar 33. The overall size is especially minimal and the guidance particularly precise in the embodiments where the teeth 34 are mounted in a recessed zone 38 of the drive bar 33 so as to allow peripheral guidance of the guide bar 30.

The invention claimed is:

1. An air inlet for an aircraft propulsion assembly, said aircraft propulsion assembly extending along a longitudinal axis oriented from upstream to downstream and comprising a turbomachine configured to allow propulsion of the aircraft from an internal air flow acceleration that is circulating from upstream to downstream in the turbomachine, said air inlet circumferentially extending about the longitudinal axis and comprising a movable upstream part, a fixed downstream part and at least one moving member configured to translationally move the movable upstream part with respect to the fixed downstream part, said movable upstream part comprising:

an upstream internal wall pointing towards the longitudinal axis and configured to guide the internal air flow, an upstream external wall, opposite to the upstream internal wall, configured to guide an external air flow, and an air inlet lip connecting the upstream internal wall and the upstream external wall, said movable upstream part being movable between a retracted position, in which said movable upstream part is adjacent to the fixed downstream part, and a deployed position, in which said movable upstream part is spaced apart upstream of the fixed downstream part in order to delimit together a through channel for fluidly circulating between the external air flow and the internal air flow, the at least one moving member comprising:
    at least one guide bar connected to said movable upstream part, and
    a drive bar comprising a plurality of teeth,
the fixed downstream part comprising, for each moving member:
    a toothed wheel configured to be rotatably driven and to cooperate with the teeth of the drive bar so as to form a rack-and-pinion connection for moving the at least one moving member and said movable upstream part,
    at least one guide member configured to guide the at least one guide bar when moving the at least one moving member,
wherein the drive bar extends as a downstream extension of the at least one guide bar and comprises an external wall comprising an angular drive portion, where the teeth are mounted, and an angular guide portion,
wherein the at least one guide member is a downstream guide member configured to successively guide the at least one guide bar and the angular guide portion of the drive bar, and
wherein the angular drive portion comprises a recessed zone in which the teeth are mounted.

2. The air inlet according to claim 1, wherein said movable upstream part circumferentially extends about the longitudinal axis.

3. The air inlet according to claim 2, wherein said movable upstream part forms a unitary assembly.

4. The air inlet according to claim 1, wherein the angular guide portion extends over at least 120° from the external wall of the drive bar.

5. The air inlet according to claim 1, wherein the angular drive portion extends radially inwardly of the angular guide portion with respect to the axis of the at least one moving member.

6. The air inlet according to claim 1, wherein the downstream guide member peripherally extends about the at least one moving member.

7. The air inlet according to claim 1, wherein the downstream guide member partially peripherally extends about the at least one moving member.

8. An aircraft propulsion assembly extending along a longitudinal axis oriented from upstream to downstream and comprising a turbomachine configured to allow propulsion of the aircraft from the acceleration of the internal air flow circulating from upstream to downstream in the turbomachine, said aircraft propulsion assembly comprising the air inlet according to claim 1.

9. The aircraft propulsion assembly according to claim 8, wherein the turbomachine is supersonic.

10. A method for using in flight the air inlet of an aircraft propulsion assembly according to claim 1, wherein the toothed wheel is driven in a first direction of rotation to move said movable upstream part in a first direction of translation oriented from the deployed position to the retracted position, so as to reduce the internal air flow taken in.

11. An air inlet for an aircraft propulsion assembly, said aircraft propulsion assembly extending along a longitudinal axis oriented from upstream to downstream and comprising a turbomachine configured to allow propulsion of the aircraft from an internal air flow acceleration that is circulating from upstream to downstream in the turbomachine, said air inlet circumferentially extending about the longitudinal axis and comprising a movable upstream part, a fixed downstream part and at least one moving member configured to translationally move the movable upstream part with respect to the fixed downstream part, said movable upstream part comprising:
    an upstream internal wall, pointing towards the longitudinal axis and configured to guide the internal air flow,
    an upstream external wall, opposite to the upstream internal wall, configured to guide an external air flow, and
    an air inlet lip connecting the upstream internal wall and the upstream external wall,
    said movable upstream part being movable between a retracted position, in which said movable upstream part is adjacent to the fixed downstream part, and a deployed position, in which said movable upstream part is spaced apart upstream of the fixed downstream part in order to delimit together a through channel for fluidly circulating between the external air flow and the internal air flow,
the at least one moving member comprising:
    at least one guide bar connected to said movable upstream part, and
    a drive bar comprising a plurality of teeth,
the fixed downstream part comprising, for each moving member:
    a toothed wheel configured to be rotatably driven and to cooperate with the teeth of the drive bar so as to form a rack-and-pinion connection for moving the at least one moving member and said movable upstream part,
    at least one guide member configured to guide the at least one guide bar when moving the at least one moving member, and
    wherein the at least one moving member comprises a plurality of guide bars and a connection element configured to connect the drive bar to each guide bar.

12. The air inlet according to claim 11, wherein said movable upstream part circumferentially extends about the longitudinal axis.

13. The air inlet according to claim 12, wherein said movable upstream part forms a unitary assembly.

14. The air inlet according to claim 11, wherein:
the drive bar extends as a downstream extension of the at least one guide bar and comprises an external wall comprising an angular drive portion, where the teeth are mounted, and an angular guide portion,
at least one guide member in the form of a downstream guide member configured to successively guide the at least one guide bar and the angular guide portion of the drive bar.

15. The air inlet according to claim 14, wherein the angular guide portion extends over at least 120° from the external wall of the drive bar.

16. The air inlet according to claim 14, wherein the angular drive portion comprises a recessed zone in which the teeth are mounted.

17. The air inlet according to claim 14, wherein the downstream guide member peripherally extends about the at least one moving member.

18. The air inlet according to claim 14, wherein the downstream guide member partially peripherally extends about the at least one moving member.

19. An aircraft propulsion assembly extending along a longitudinal axis oriented from upstream to downstream and comprising a turbomachine configured to allow propulsion of the aircraft from the acceleration of the internal air flow circulating from upstream to downstream in the turbomachine, said aircraft propulsion assembly comprising the air inlet according to claim 11.

20. A method for using in flight the air inlet of an aircraft propulsion assembly according to claim 11, wherein the toothed wheel is driven in a first direction of rotation to move said movable upstream part in a first direction of translation oriented from the deployed position to the retracted position, so as to reduce the internal air flow taken in.

* * * * *